US 6,430,144 B1

United States Patent
Liao et al.

(10) Patent No.: US 6,430,144 B1
(45) Date of Patent: Aug. 6, 2002

(54) CONTROL METHOD OF AUTO-BALANCING SYSTEM OF OPTICAL DISK DRIVE

(75) Inventors: Cheng-Yao Liao; Tzu-Nan Chen; Lih-Hwa Kuo, all of Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 09/571,277

(22) Filed: May 16, 2000

(51) Int. Cl.$^7$ .......................... G11B 19/20; F16F 15/22
(52) U.S. Cl. ........................ 369/267; 310/51; 74/573 R
(58) Field of Search ................................. 369/264, 266, 369/263, 267; 74/573 R; 360/99.08; 310/51

(56) References Cited

U.S. PATENT DOCUMENTS

| | | | | |
|---|---|---|---|---|
| 4,075,909 A | * | 2/1978 | Deakin ...................... | 74/573 R |
| 5,111,713 A | * | 5/1992 | Cameron et al. .............. | 74/572 |
| 5,605,078 A | * | 2/1997 | Taylor et al. .............. | 74/573 R |
| 5,845,542 A | * | 12/1998 | Hannah et al. ............ | 74/573 R |
| 6,005,749 A | * | 12/1999 | Ikuta et al. ..................... | 310/51 |
| 6,125,098 A | * | 9/2000 | Osawa ........................ | 369/266 |
| 6,205,110 B1 | * | 3/2001 | Miyamoto et al. ........ | 360/99.08 |
| 6,252,841 B1 | * | 6/2001 | Osawa et al. ............ | 360/99.08 |
| 6,295,269 B1 | * | 9/2001 | Takeuchi et al. ............ | 369/263 |
| 6,314,077 B1 | * | 11/2001 | Shishido et al. ............ | 369/263 |
| 6,333,912 B1 | * | 12/2001 | Sohn ........................... | 369/263 |
| 6,348,747 B1 | * | 2/2002 | Liao et al. ..................... | 310/51 |

* cited by examiner

Primary Examiner—Brian E. Miller
(74) Attorney, Agent, or Firm—Rosenberg, Klein & Lee

(57) ABSTRACT

The present invention proposes a control method of the auto-balancing system of an optical disk drive. The present invention adds a procedure of constant rotation speed in the acceleration process of the spindle motor when the rotation speed is below a critical speed. When the rotation speed of the spindle motor is below the critical speed, the position of added mass will be situated at a position at the same side of the unbalance vector of the original optical disk. Thereby the balancing mass will remain at the position of worst balancing effect in the procedure of constant rotation speed. After the procedure of constant rotation speed, the spindle motor will be accelerated to pass the critical speed of the system by the largest torque. Because of inertial effect, when the rotation speed of the spindle motor exceeds the critical speed, the balancing mass will leave from the original position of worst balancing effect and smoothly move to an opposite position of the unbalance vector of the original optical disk. Best balancing effect can thus be achieved.

2 Claims, 3 Drawing Sheets

---

During the acceleration process of the spindle motor toward the highest rotation speed, a procedure of constant rotation speed is added when the rotation speed is below the critical speed so that the balancing mass will remain at the position of worst balancing effect.

↓

The spindle motor will be accelerated to pass the critical speed by the largest torque. Because of inertial effect, the balancing mass will leave from the original position of worst balancing effect.

↓

When the rotation speed of the spindle motor exceeds the critical speed, the balancing mass will smoothly move to an opposite position of the unbalance vector of the original optical disk, thus achieving the best balancing effect.

During the acceleration process of the spindle motor toward the highest rotation speed, a procedure of constant rotation speed is added when the rotation speed is below the critical speed so that the balancing mass will remain at the position of worst balancing effect.

→

The spindle motor will be accelerated to pass the critical speed by the largest torque. Because of inertial effect, the balancing mass will leave from the original position of worst balancing effect.

→

When the rotation speed of the spindle motor exceeds the critical speed, the balancing mass will smoothly move to an opposite position of the unbalance vector of the original optical disk, thus achieving the best balancing effect.

FIG.3

CONTROL METHOD OF AUTO-BALANCING SYSTEM OF OPTICAL DISK DRIVE

FIELD OF THE INVENTION

The present invention relates to a control method of the auto-balancing system of an optical disk drive and, more particularly, to a control method, which can assist the balancing mass to move smoothly to an opposite position of the unbalance vector of an optical disk during the acceleration process to achieve best balancing effect.

BACKGROUND OF THE INVENTION

Along with the progress of media-accessing technology of optical information, the reading speed of optical disk drives used as computer peripherals has been continually increased. Nowadays, CD-ROMs with spindle motors having rotation speed exceeding 10000 rounds per minute (RPM) have become the mainstream products in the market.

When the spindle motor rotates at a high speed, the eccentric swinging force resulted from the unbalanced mass of an optical disk will be increased, resulting in problems such as vibration and noise.

In practical applications of optical disk drives, excess vibration will cause the instability of reading capacity of the optical reading head so that optical disk drives can not steadily read data at the highest rotation speed. Additionally, the noise generated by optical disk drives with high rotation speed will cause discomfort and botheration in usage to the user.

Therefore, how to suppress vibration effectively to let optical disk drives read data steadily when optical disks therein rotate at high speeds is a problem that all manufacturers of optical disk drives must overcome.

Conventionally, there are three methods that the manufacturers of optical disk drives adopt to reduce the vibration resulted from the unbalanced mass of optical disks rotating at a high speed: (1). The weight of the reading mechanism is increased directly to reduce the vibration; (2). A dynamic absorber is used to reduce the vibration; (3). An auto-balancing system is used to reduce the vibration.

All the three methods mentioned above can reduce the vibration of optical disk drives. In theory, the effect of the auto-balancing system is best because it directly reduce the exciting force of vibration by means of adding balancing mass.

The auto-balancing system used by the manufacturers of optical disk drives is generally situated above (or below) the spindle motor. The auto-balancing system comprises a balancing mass (generally being a predetermined number of steel beads) and a housing (generally being of circular shape) for bearing the balancing mass. In the rotor dynamics, when the rotation speed of the spindle motor exceeds a critical speed, the position of added mass will be situated at the opposite position of unbalance vector of the original optical disk. Thereby the unbalance of the original optical disk can be counterbalanced, and the vibration of the optical disk drive can be reduced.

However, because of some limitations in manufacturing (e.g., the degree of circularity, the degree of homo-centricity, the surface roughness, and the uncertainty in acceleration which is caused by different rotation load resulted from unequal unbalance of different optical disks during the accelerating process of the spindle motor), the balancing effect in practical applications is not as perfect as that predicted in theory.

SUMMARY AND OBJECTS OF THE PRESENT INVENTION

Accordingly, the primary object of the present invention is to propose a new control method of the auto-balancing system. The proposed control method can reduce the vibration caused by the unbalance of optical disks through an effective and steady way when the optical disks rotate at a high speed. High-speed and exact reading of data and smooth rotation can thus be achieved.

To achieve the above object, the present invention proposes a control method of the auto-balancing system of an optical disk drive. The present invention adds a procedure of constant rotation speed in the acceleration process of the spindle motor when the rotation speed is below a critical speed. According to the rotor dynamics, when the rotation speed of the spindle motor is below the critical speed, the position of added mass will be situated at a position at the same side of the unbalance vector of the original optical disk. Thereby the balancing mass will remain at the position of worst balancing effect in the procedure of constant rotation speed. After the procedure of constant rotation speed, the spindle motor will be accelerated to pass the critical speed of the system by the largest torque. Because of inertial effect, when the rotation speed of the spindle motor exceeds the critical speed, the balancing mass will leave from the original position of worst balancing effect and smoothly move to an opposite position of the unbalance vector of the original optical disk. Best balancing effect can thus be achieved.

The various objects and advantages of the present invention will be more readily understood from the following detailed description when read in conjunction with the appended drawings, in which:

BRIEF DESCRIPTION OF DRAWING

FIG. 3 is a flowchart of the control method of the present invention.

DETAILED DESCRIPTION OF PREFERRED EMBODIMENT

Figure 1:
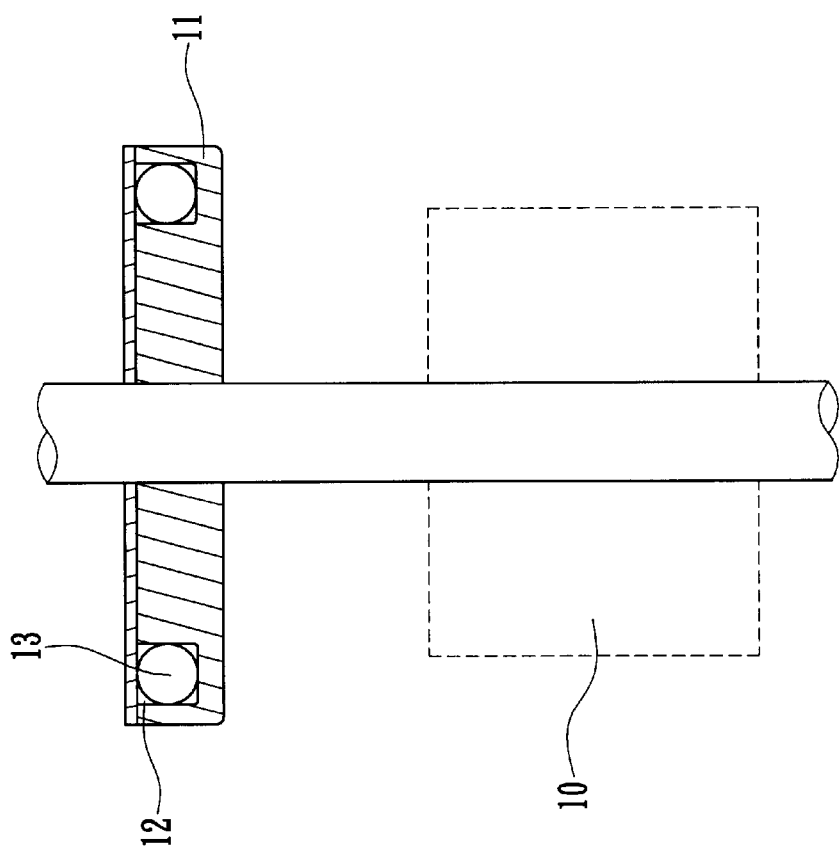
FIG. 1 is a diagram showing a single-track auto-balancing system of the present invention.
Figure 2:
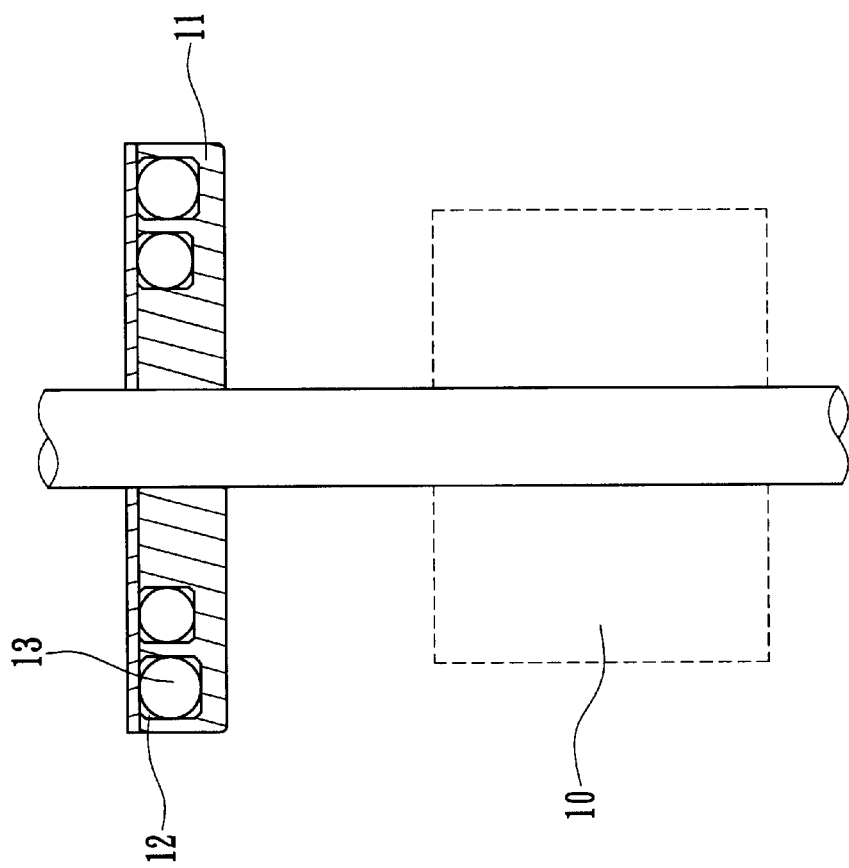
FIG. 2 is a diagram showing a multi-track auto-balancing system of the present invention.

The present invention relates to a control method of the auto-balancing system of an optical disk drive and, more particularly, to a method using a specific acceleration process to assist the auto-balancing system and suitable to single-track and multi-track auto-balancing systems. As shown in FIG. 1, a general auto-balancing system is situated above (or below) the spindle motor 10. The auto-balancing system comprises a housing 11 capable of synchronously rotating with the spindle motor 10. A circular track 12 with its center at the rotation axis of the housing 11 is disposed on the housing 11. The track 12 is an annular groove. At least one steel bead (balancing mass) 13 is installed in the track 12. A single-track auto-balancing system is thus formed. As shown in FIG. 2, a plurality of tracks 12 can be disposed on the housing 11 to form a multi-track auto-balancing system.

The present invention uses a specific acceleration process to assist the auto-balancing system to obtain the best balancing effect. As shown in FIG. 3, the control method of the auto-balancing system of an optical disk drive comprises the following steps:

(a). During the acceleration process of the spindle motor 10 toward the highest rotation speed, a procedure of constant rotation speed is added when the rotation speed is below the critical speed so that the balancing mass (steel bead) 13 will remain at the position of worst balancing effect so as to increase the perturbing force when the rotation speed exceeds the critical speed;

(b). The spindle motor 10 will be accelerated to pass the critical speed by the largest torque. Because of inertial effect, the balancing mass will leave from the original position of worst balancing effect;

(c). When the rotation speed of the spindle motor 10 exceeds the critical speed, the balancing mass will smoothly move to an opposite position of the unbalance vector of the original optical disk, thus achieving the best balancing effect.

The present invention proposes a new control method used in single-track or multi-track auto-balancing systems. The proposed control method can reduce the vibration caused by the unbalance of optical disks through an effective and steady way when optical disks rotate at a high speed. High-speed and exact reading of data and smooth rotation can thus be achieved.

Although the present invention has been described with reference to the preferred embodiments thereof, it will be understood that the invention is not limited to the details thereof Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A control method for an auto-balancing system of an optical disk drive, said optical disk drive provided with a spindle motor and said spindle motor having an axis of rotation, said control method comprising the steps of:

(a) providing the optical disk drive with the housing affixed to the spindle motor so as to rotate about the axis of rotation of the spindle motor;

(b) forming in said housing at least one circular track, said at least one circular track coaxially located on the rotational axis of the spindle motor;

(c) providing each of said at least one circular track with at least one balancing mass, wherein each of said at least one balancing mass is sized to move smoothly within said each of said at least one circular track;

(d) driving the spindle motor into rotation such that an angular velocity about the rotational axis of the spindle motor increases linearly with time until said angular velocity is equal to a predetermined angular velocity, said predetermined angular velocity reinforcing a maximal imbalance of the auto-balancing system;

(e) controlling said angular velocity about the rotational axis of the spindle motor to be equal to said predetermined angular velocity and maintaining said angular velocity at said predetermined angular velocity for a predetermined period of time;

(f) further driving the spindle motor into rotation such that an angular velocity about the rotational axis of the spindle motor increases above said predetermined angular velocity predetermined constant acceleration, said predetermined constant acceleration being set so as to effectuate a maximal torque about the rotational axis of the spindle motor, wherein said maximal torque produces a relative displacement between said each of said at least one circular tracks and said each of said at least one balancing masses; and (g) terminating said predetermined constant acceleration when said angular velocity about said rotational axis of said spindle motor is equal to a maximum rotational speed of the spindle motor, wherein said maximum rotational speed is greater than a critical speed, wherein said critical speed is an angular velocity about the rotational axis of the spindle motor at which said each of said balancing masses smoothly moves to a location of mass within said housing which produces a maximal balance of said auto-balancing system.

2. The control method for an auto-balancing system of an optical disk drive as recited in claim 1, wherein the process step providing each of said at least one circular track with at least one balancing mass includes the additional process step of shaping each of said at least one balancing mass into a sphere.

* * * * *